Figures 4, 5:
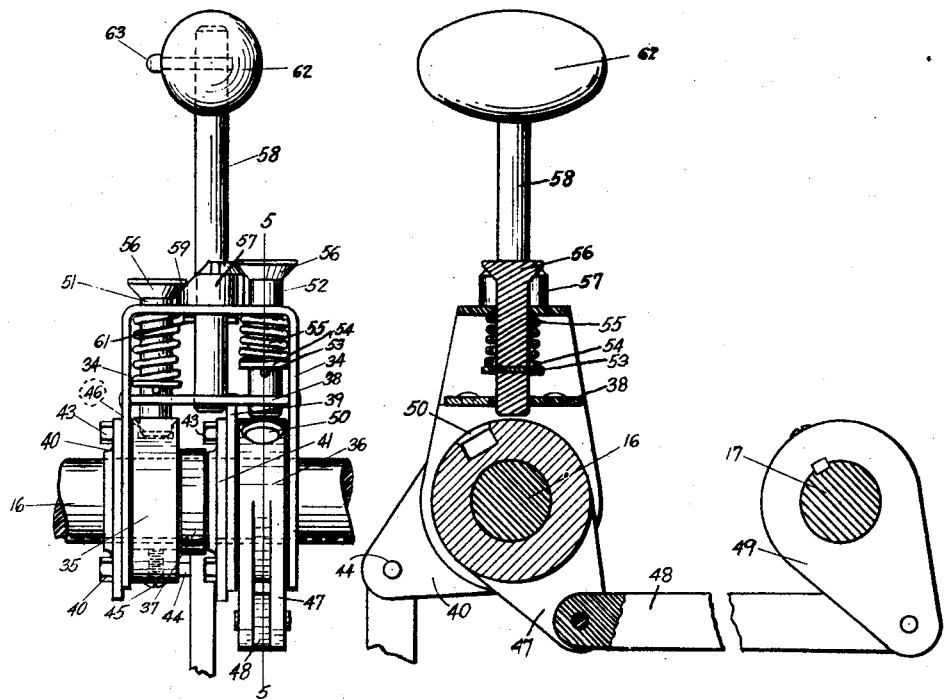

March 21, 1933.   F. B. ADAM   1,901,886
LIGHTING CONTROL APPARATUS
Filed April 26, 1929   2 Sheets-Sheet 1
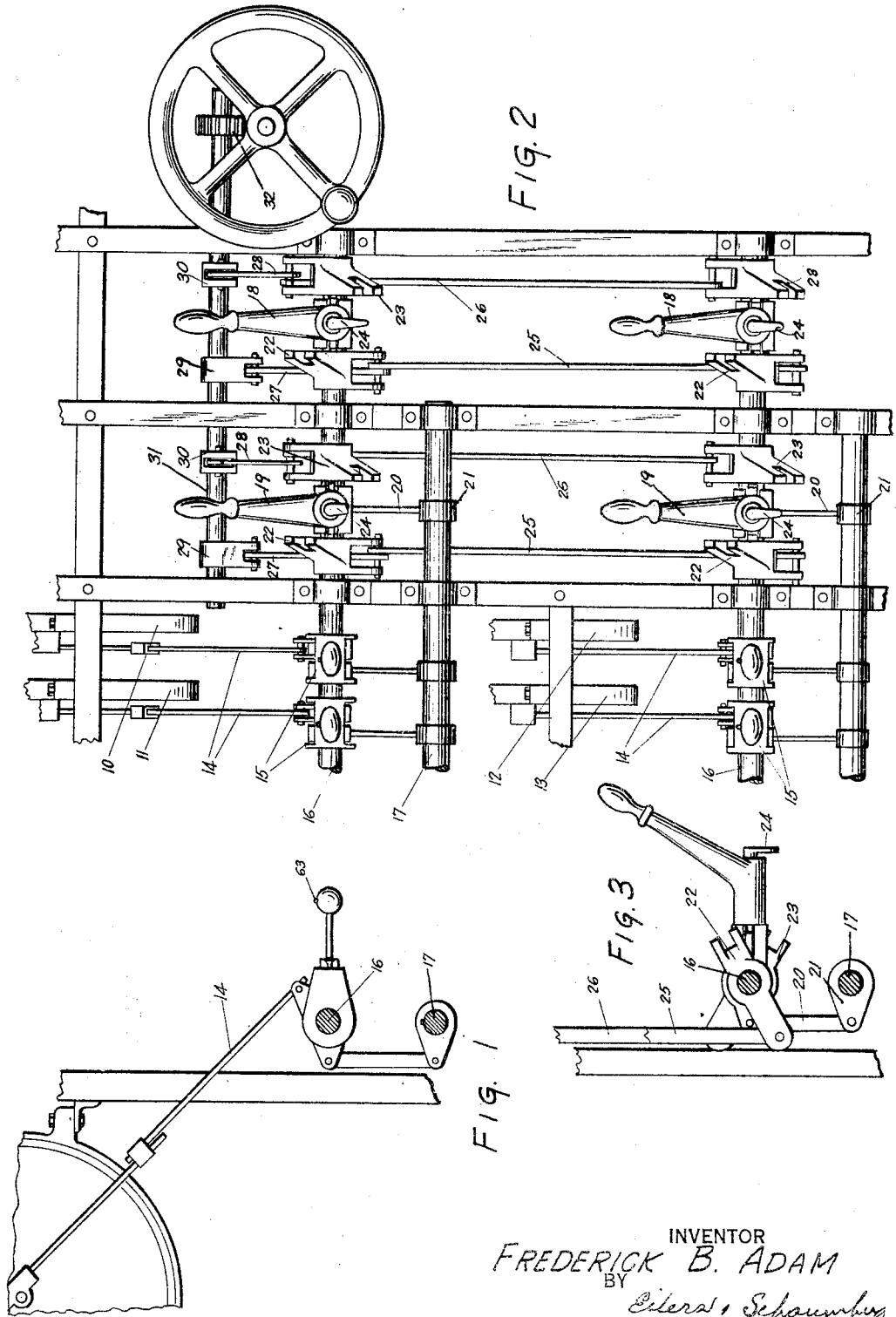
INVENTOR
FREDERICK B. ADAM
BY
ATTORNEYS March 21, 1933. F. B. ADAM 1,901,886

LIGHTING CONTROL APPARATUS

Filed April 26, 1929 2 Sheets-Sheet 2

INVENTOR
FREDERICK B. ADAM
BY
ATTORNEYS

Patented Mar. 21, 1933

1,901,886

UNITED STATES PATENT OFFICE

FREDERICK B. ADAM, OF ST. LOUIS, MISSOURI

LIGHTING CONTROL APPARATUS

Application filed April 26, 1929. Serial No. 358,281.

An object of my invention is to provide an improved control system for a plurality of dimmers, whereby they may be operated individually, in groups, or all as a unit, and which facilitates the control of dimmers related to lights of either the same or different colors, and whereby the individual dimmers of the installation, may be selectively grouped or interlocked, either for direct or cross control.

A further object of the invention is to provide a dimmer control system of such a nature that the position of the individual dimmers, their relationship to each other, whether as individuals or in groups, and their set-up for group, or cross control, either of dimmers related to lights of the same or of different colors, may be readily ascertained, either by sight or touch.

A further object of my invention is to provide a dimmer control apparatus in which the separate dimmers may be interlocked for group control, and associated for operation in the same, or in reverse directions, either within, or between the several groups, and in which means are provided for indicating the position of the interlocking mechanism of the various dimmers.

A further object of the present invention is attained in the provision of means for relating any selected plurality of dimmers pertaining to lights of the same color, and disposed in rows, for either direct, or cross control.

A still further object is to provide a simple and efficient means for cross controlling any selected plurality of dimmers pertaining to lights of a given color, the dimmers to be cross controlled, being so related as to provide means for effecting proportionate dimming. It will be understood that this expression relates to facilities for varying, to any desired degree, by the use of dimmers in the circuit, the proportion of illumination to be obtained from differently located lights of the same color.

In my copending application, Serial No. 300,194, filed August 17, 1928, a system of arranging, and means for interconnecting various dimmers for operation by a master control, is shown and described. It is possible, with that construction, to dim lights of a certain color, and concurrently increase the intensity of illumination of lights of a different color. For example, the blue foot lights may be gradually dimmed, while the brilliancy of the amber, or red foots or both may be increased. I have described this operation as cross control in different colors and while that arrangement permits of many combinations of lighting effects, certain desired effects are not obtainable with the arrangement shown therein.

With the arrangement to be presently described, I am able not only simultaneously to control and vary in either direction the intensity of illumination of lamp groups of different colors, but also concurrently to dim and brighten different lights of the same color. Thus, the white foots may be dimmed and the white prosceniums concurrently brightened, or both groups dimmed, but at different rates. This latter I term proportionate dimming.

Figures 6, 7:
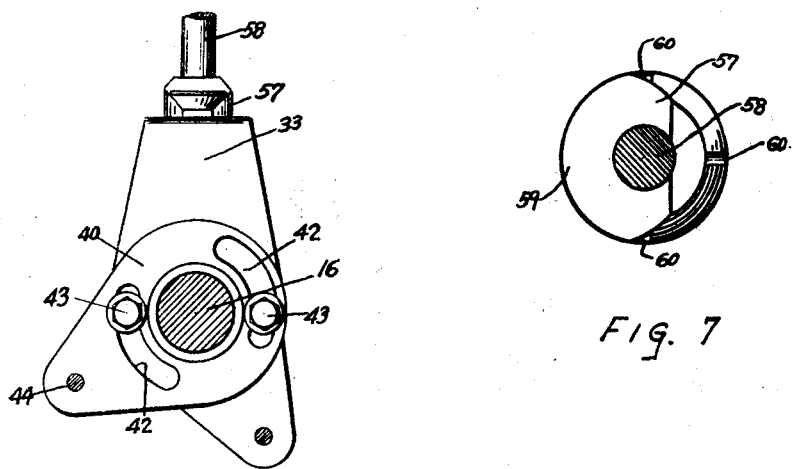

In the accompanying drawings, Fig. 1 is a side elevation of an individual dimmer control, shown as connected to a dimmer, a fragmentary portion of which is shown; Fig. 2 is a front elevation of a dimmer control assembly constructed in accordance with the present invention; Fig. 3 is a side elevation of one of the master dimmer controls shown in Fig. 2; Fig. 4 is a front elevation, showing details of an individual dimmer control mechanism; Fig. 5 is a sectional elevation taken along line 5—5 of Fig. 4; Fig. 6 is a fragmentary side elevation of the individual control shown in Fig. 4, and Fig. 7 is a top view of a control cam associated with the mechanism appearing in Fig. 4.

Referring now, by reference characters to the drawings, particularly to Fig. 2, the dimmers are arranged in rows, each row preferably controlling lamps of the same color. Thus the aligned dimmers 10 and 11, respectively, may pertain to white foot and white proscenium lights, while dimmers 12 and 13, in the row directly below, may control groups of blue lights, similarly disposed. While I show only two dimmers in each color group, and only two color groups, that number being sufficient to illustrate the present invention, it is quite obvious that any number of dimmer assemblies may be used, depending upon the size and requirements of the particular installation.

Each dimmer, in the present example, is adapted for operation by a rack and pinion, the rack rod 14 being connected to, and actuated by an individual control mechanism, indicated generally at 15. Like the dimmers, the individual control mechanisms are aligned with respect to the colors to which they pertain, being mounted on a shaft, such as 16. A shaft 17, in parallel disposition with shaft 16, is also provided, and interlinked, as best shown in Fig. 1, with each of the individual dimmer controls in such manner that the operation of the particular dimmer may be governed either by shaft 16 or shaft 17. Thus the individual control mechanisms 15, to be hereinafter described more in detail, are provided with means whereby they may each be interlocked with either of the recited shafts, or whereby each may be free, and operated independently of either of the shafts.

A master control handle or lever 18, of suitable size and shape, is mounted on and preferably keyed to shaft 16, for purposes of actuating said shaft. Similar means, for the actuation of shaft 17, are provided in the master control handle 19, and while this handle may be mounted directly on, and secured to shaft 17, I prefer, however, to mount it loosely upon shaft 16, and to actuate shaft 17 from its master control handle by indirect means. For this purpose I provide a link 20 which connects the master handle 19 to the shaft 17, through a crank arm 21, secured to shaft 17 as by a key, set screw or the equivalent. By this expedient, the individual dimmer control mechanism 15, and the master control handles 18 and 19, all relating to lights of the same color, are aligned on the same shaft.

It is thus seen that the actuation of master control handle 18 simultaneously operates all dimmers whose individual controls are interlocked with the shaft 16, and in like manner the actuation of master control handle 19, causes all dimmers interlocked, through the individual control mechanism, with shaft 17, to be operated. Now, if a scene, or lighting effect requires that certain of the lighting groups controlled in the same row, be dimmed, say the white foots, while others be simultaneously brightened, for example, the white prosceniums, this effect may be accomplished by interlocking certain of the dimmers with shaft 16, and others with the shaft 17; and moving the shafts, by means of the master handles, in the directions necessary to produce the desired result.

Since, as will appear from the preceding description, the master control handles 18 and 19 are entirely independently operable, it will be obvious that the relative rates of rotation of shafts 16 and 17 may be varied as desired, either when operating the shafts in the same, or in opposite directions. This facility thus permits of proportionate dimming when operating the master handles 18 and 19 for either direct or cross control.

The operation of the means just described, relates to direct, cross, and proportionate control of lamp groups of the same color row, by the direct actuation of the master control handles pertaining to that particular color row.

The means next to be described, provide a method for interconnecting any or all of the color row actuating shafts for their concurrent operation in either direction by a wheel or lever, known as a grand master control.

As is described in detail in my copending application heretofore referred to, a clutch lever 22 is disposed on the left side of each master control handle, and another, 23, on the right side thereof, these levers being carried by and adapted to rotate freely on the shafts 16. For purposes of the present invention it is believed sufficient to indicate that each of the master control handles 18 and 19, together with certain features of the associated clutch levers 22 and 23, constitute a clutch, whereby the selective operative engagement of either clutch lever by the master control handle may be obtained. As a means for actuating this clutch into engagement with either lever 22 or 23 associated with a given master control lever, I provide a clutch actuating and indicating handle 24, which when turned horizontally to the left, effects a connection between its master control lever, and the clutch lever 22 disposed immediately to the left thereof. When the handle is turned horizontally to the right, an operative connection between the master control lever and the lever 23 is effected. When the handle 24 is disposed vertically downward, its master control lever is freed from operative engagement with either of its associated clutch levers.

As appears from Fig. 2, each color row (only two of which are shown) is provided with a pair of color master dimming control handles, 18 and 19, each with its clutch assembly, as hereinbefore described. The master control handles for the various color rows are preferably arranged in vertical alignment, which permits of the clutch levers 22 being interconnected by a vertical link 25, and the clutch levers 23 being interconnected by a like link 26. Links 27 and 28, respectively, connect the clutch levers 22 and 23 to crank arms 29 and 30 disposed on a rocker, or counter shaft 31. The crank arms, 29 and 30, are angularly disposed with respect to each other, so that the rotation of the shaft 31, as by a worm and wheel, indicated generally at 32, produces rotation through a limited arc of the clutch levers 22 and 23, in respectively opposite directions.

While I show and describe a particular link and lever system, any suitable method may be employed for obtaining simultaneous movement of all the clutch levers, with levers on one side of the master control handle moving oppositely to those on the other.

Now, it is obvious that any dimmer or group of dimmers, whether in the same or different color rows, may be actuated by the grand master device. Further, certain of the dimmers may be actuated in a direction to increase the illumination of lights controlled thereby, while other dimmers are being simultaneously actuated to decrease the illumination of their respective lighting circuits.

Thus, assuming as before that dimmer 10 pertains to the white foots and dimmer 11 to the white proscenium, the cross control of these groups may be obtained by interlocking one of the individual control mechanisms 15, with shaft 16 (by means to be hereinafter described) and the other thereof with shaft 17. Now, if the master control handle 18 be interlocked with clutch lever 22 and the master control handle 19 with clutch lever 23, actuation of the grand master device will operate the master handles, hence the shafts 16 and 17, and the dimmers 10 and 11, in opposite directions. By setting the interlocking devices of the selected individual and master controls in each color row, concurrent movement in predetermined directions, of any or all of the dimmers on the entire board may be obtained.

I will now describe in detail the individual dimmer control mechanism, hereinbefore indicated, generally, by reference character 15, and illustrated by Figs. 4, 5, and 6. The control assembly 15, provides means for selectively interlocking its associated dimmer with either of the aforementioned shafts 16 or 17, or for operating the dimmer independently of the shaft by the direct actuation of a handle, provided for the purpose. In addition, means are provided for indicating, by sight and touch, the manner in which the particular dimmer has been interconnected with the remainder of the system.

The individual dimmer control mechanism constitutes a substantially U shaped frame 33, having legs 34 suitably spaced to accommodate therebetween collars 35 and 36, separated by a spacer collar 37. A cross member 38, extending transversely between the legs 34, and secured thereto as by welding or riveting, rigidly supports an intermediate leg 39, which is disposed preferably between the collars 36 and 37. The frame 33 and collars are adapted to be positioned on one of the control shafts, as 16, the frame being freely rotatable with respect to the shaft.

Since the relative location of dimmer and dimmer actuating mechanism is not the same for all installations, the connecting means between the rack, or actuating rod 14, and the frame 31, is made adjustable, to suit various structural conditions. An arm 40, mounted loosely on the shaft adjacent one leg 34, and a similar arm 41 adjacent the intermediate leg 39, are provided with arcuate slot openings 42. Bolts 43 extending through these slots and into tapped holes in the legs 34 and 39 adjustably secure the arms 40 and 41 to the frame. The dimmer actuating rod is connected to these arms at their outer end as by a pin 44, which extends through the actuating rod and the paired arms. In this manner, movement of the frame 33 is transmitted to the dimmer. By comparing Figs. 1 and 5, it will be observed that the frame and arms have relatively different angular positions. Fig. 5 contemplates the mounting of the dimmer somewhat on the same level as the control assembly 15, whereas the relative angular position of the frame and arm, in Fig. 1, permits of the dimmer being located above the control 15, as shown therein.

As best appears in Fig. 4, the collar 35, definitely secured to the shaft 16 by suitable means such as a set screw 45, which may or may not be supplemented by a key, is provided with a depression 46 in the outer cylindrical surface thereof, for a purpose to be later explained. The collar 36 hereinbefore mentioned, is freely rotatable on the shaft 16 and preferably includes one or more arms 47, by which it is connected, through a link 48, to the crank 49 on the auxiliary shaft 17. Like collar 35, collar 36 is provided with a depression 50 for purposes hereinafter appearing. Means for selectively engaging the recited collars by the frame are provided in the plungers 51 and 52. The plungers are radially disposed, with respect to the shaft 16 and extend through suitable openings in the bridge portion 53 of the frame, and the cross member 38. The plungers are adapted for longitudinal movement and each is provided with a pin 53, a washer 54, and a coil spring 55, positioned around the plunger. Outward movement of the plungers results in compression of the coil springs 55 between the bridge frame portion 53 and the washer 54. Each plunger is provided with an enlarged head portion 56 of frusto-conical shape, each of which forms the follower of a cam 57 for purposes hereinafter appearing.

The cam 57, rotatably carried by an actuating stem 58, is adapted to cooperate with the plunger heads 56, and governs the movement and position of the plungers. In its simplest form, the cam comprises a short cylinder having a portion thereof removed preferably at an angle, to provide a low portion indicated at 59. That plunger, which is adjacent the portion 59 of the cam, is forced by the spring into its innermost position, whereupon it is adapted to extend into the depression, such as 46, and thus into engagement with the collar associated therewith, for instance 35. The cam construction is such that both plungers cannot, at the same time, engage their respective collars. They may, however, be simultaneously sustained in their outermost positions, whereby the frame 33 is operatively free of both shafts. In order that the operating positions of the plungers be definitely established, I provide, in the present case, three depressions 60 in the cam surface 59, so conformed as to engage the plunger heads. The actuating stem, 58, like the plungers, extends through the members 38 and is retained on the frame by a through pin or cotter key 61, immediately underlying the member 53.

A handle 62, preferably of ellipsoidal form, is attached to the outer end of the stem 58 by a screw 63, the head of which projects from the surface of the handle. The handle is positioned on the stem so that it affords a means for ascertaining the interlocked or non-interlocked relation existing between the shafts and dimmer control frame; and the screw head 63 indicates which, if either, of the shafts 16 and 17 is operatively engaged by dimmer mechanism.

It will be seen that the described example of the invention affords a relatively simple and inexpensive, yet efficient means of obtaining a great variety of illuminating effects. It will, however, be understood that that present example represents only a single preferred embodiment, to be understood in an illustrative, and not in a limiting sense, and that the parts described, as well as their combinations and arrangement, may be varied substantially without departing from the full spirit and scope of the invention, as defined by the appended claims.

I claim as my invention:

1. In a lighting control system, a bank of dimmers, disposed in substantially parallel rows, with the dimmer axes of each row in substantial alignment, means, including rotatable elements extending along each dimmer row, for operatively associating any selected number of said dimmers into groups, and means coacting with said associating means, for simultaneously operating the groups of dimmers, in opposite directions, irrespective of whether any of said groups includes dimmers within the same, or in different rows.

2. In a lighting control system, a row of dimmers, disposed in substantially coaxial relation, a pair of actuating elements, each common to the dimmers, and extended along the row, means for operatively associating either of said actuating elements with any selected number of said dimmers, and means for independently operating said elements and their associated dimmers.

3. In a lighting control system, a plurality of dimmers disposed in a row, in substantially parallel, coaxial relation, and dimmer associating and operating means whereby any of said dimmers may be actuated concurrently with, and at a different rate and in a different direction from, any of the remaining dimmers, said means including a plurality of actuating elements, each common to the dimmers of the row, and arranged severally for operative connection with any of the dimmers of said row.

4. In a lighting control system, a plurality of dimmers disposed in a row, a pair of shafts associated with said row, and means for operatively connecting any selected number of dimmers with either of said shafts, and means for actuating said shafts, independently of each other.

5. In a lighting control system, a plurality of dimmers disposed in a row, a plurality of shafts, means for operating said shafts independently of each other, means associating each dimmer with each of said shafts, and means for operatively connecting any selected number of said dimmers, for actuation to any of said shafts.

6. In a lighting control system including dimmers, a pair of shafts, a control individual to each of said dimmers, and associated with each shaft, said means for operatively connecting each control, selectively, to either of said shafts.

7. In a lighting control system including dimmers, a pair of shafts, a control individual to each of said dimmers and associated with each shaft, and means, including a portion secured to one of said shafts, for operatively connecting each control, selectively, to either of said shafts.

8. In a lighting control system, a plurality of dimmers adapted for individual actuation, a manipulative member for each dimmer, a plurality of independently movable, dimmer actuating shafts, and shaft connecting means operable by said manipulative members, for operatively connecting said dimmers selectively with said shafts.

9. In a lighting control system, a plurality of dimmers adapted for individual actuation, a manipulative element for each dimmer, a plurality of shafts, each movable independently of the others, and clutching means for selectively connecting said shafts with said dimmers, said means being arranged for actuation by said manipulative elements.

10. In a lighting control system including dimmers, an operating member for each of said dimmers, a pair of independently movable shafts, each adapted for group actuation of said dimmers, clutches for connecting each of said operating members with either of said shafts, and clutch actuating means associated with each of said operating members.

11. In a lighting control system including dimmers, a manipulative element for each of said dimmers, a pair of independently movable shafts each adapted for group actuation of any number of said dimmers, and clutching means associated with each of said manipulative elements for interlocking its associated dimmer with either of said shafts.

12. In a lighting control system, a dimmer, an individual control element for said dimmer, a plurality of independently movable shafts, and means adapted to be operated by said control element, for selectively connecting said shafts, with said control element.

13. In a lighting control system, a dimmer, an individual control for said dimmer, a plurality of shafts, adapted selectively to actuate said dimmer, and connecting means carried by one of said shafts for selectively operatively connecting any of said shafts with said individual control.

14. In a lighting control system, a dimmer, a control assembly therefor, including a handle, a plurality of shafts, a clutch for each of said shafts, associated with said control assembly, and means operable by said handle for effecting selective engagement of said clutches.

15. In a lighting control system, a dimmer, a plurality of actuating shafts therefor, a dimmer control assembly including a rotatable frame, an operating handle, shaft connector collars associated with said frame, means operatively associating each of said collars with one of said shafts, plungers adapted to extend from said frame, each adapted for engagement with one of said collars, and means for actuating said plungers by said handle.

FREDERICK B. ADAM.